United States Patent [19]
Bearden

[11] Patent Number: 5,280,944
[45] Date of Patent: Jan. 25, 1994

[54] CARRIER FOR TRANSPORTING FENCE PANELS

[76] Inventor: Joe E. Bearden, P.O. Box 37, Avery, Tex. 75554

[21] Appl. No.: 922,883

[22] Filed: Jul. 31, 1992

[51] Int. Cl.⁵ .............................................. B62B 3/04
[52] U.S. Cl. .................................. 280/656; 280/402; 280/47.35; 280/79.7
[58] Field of Search ...................... 280/400, 402, 491.1, 280/491.2, 79.7, 47.34, 47.35, 498, 410, 651, 79.3, 79.11, 35, 656, 33.991

[56] References Cited

U.S. PATENT DOCUMENTS

| | | | |
|---|---|---|---|
| 2,885,090 | 5/1959 | Forman et al. | 280/35 |
| 3,955,826 | 5/1976 | Riedesel | 280/35 |
| 4,221,395 | 7/1980 | Carte | 280/79.3 |

FOREIGN PATENT DOCUMENTS 677437  8/1952  United Kingdom ................. 280/35

OTHER PUBLICATIONS

Daniels Mfg. Co., Mar. 10, 1992, FIGS. 7-9.
Video Cattle Auction Catalog; Aug. 30, 1991, p. 75.

Primary Examiner—Richard M. Camby
Attorney, Agent, or Firm—Timmons & Kelly

[57] ABSTRACT

A frame having a pair of vertical support posts is mounted on a pair of axles with sets of wheels. A pair of arms extend transversely from the upper ends of the vertical support posts in order to support portable fence panels. An alignment bar is attached to the forward vertical support post and extends across the front of the fence panels to keep the fence panels aligned. The alignment bar has a primary bar and two extensions for extending the length of the alignment bar. Hooks on each extension wrap around the outermost fence panels to hold the fence panels together.

16 Claims, 3 Drawing Sheets

CARRIER FOR TRANSPORTING FENCE PANELS

BACKGROUND OF THE INVENTION

1. Field of the Invention

This invention relates in general to cargo carriers. In particular, the invention relates to carriers, such as trailers, for transporting portable fence panels.

2. Description of the Prior Art

Portable fence panels provide a good way for farmers and ranchers to set up and take down a temporary fence. Each fence panel may be approximately eight or sixteen feet long and about six feet high. When the fence is disassembled, the fence panels can be stacked together and transported to another site.

The best way to transport and to store fence panels is on a panel trailer. Prior art trailers have a frame mounted on one or two axles. The frame usually has a pair of arms extending transversely from the frame to support the fence panels.

The panels must then be secured in some manner to prevent the panels from moving forward or backward on the arms. In some cases a wire cable has been wrapped around the panels and secured to keep the panels aligned with one another. However, even the cable would not always keep the panels aligned with one another. A quicker, easier, and more efficient method was desired for keeping the fence panels aligned.

SUMMARY OF THE INVENTION

The general object of the invention is to provide a carrier for transporting and for storing a quantity of fence panels. In general, this object is accomplished by the provision of a carrier having a frame with transverse arms on which the fence panels are supported. An alignment bar extends from the frame to keep the front edges of the panels aligned.

The alignment bar has a primary bar and a pair of extensions telescopically connected to the primary bar. The extensions each have a hook on the end of the extension for wrapping around the outermost fence panel to hold the fence panels together. A pair of pins are inserted through aligned holes in the primary bar and the extensions to lock the alignment bar at a selected length.

The above, as well as additional objects, features, and advantages of the invention will become apparent in the following detailed description.

DESCRIPTION OF THE PREFERRED EMBODIMENT

Figure 1:
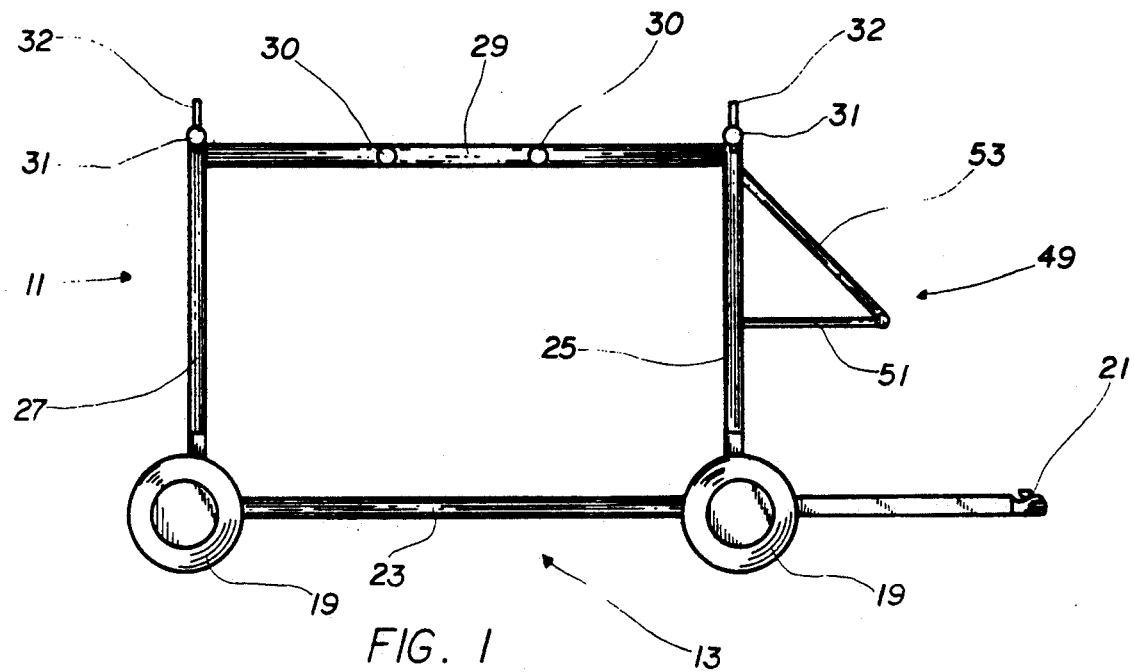
FIG. 1 is a side elevation of the carrier of the invention.
Figure 2:
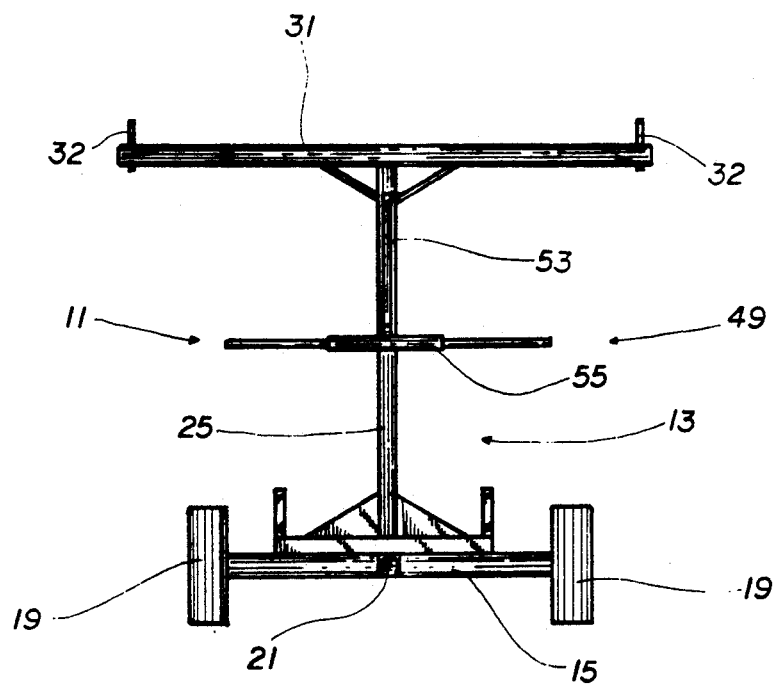
FIG. 2 is a front elevation of the carrier of the invention.

The preferred embodiment of the invention is a trailer 11, but could conceivably be self-propelled. The carrier 11 has a frame 13 mounted on a pair of axles, a forward axle 15 and a rear axle 17. Each axle 15 and 17 carries a set of wheels 19. A trailer hitch 21 extends forward from the forward axle 15 to provide a means for connecting the trailer 11 to a prime mover, such as a truck or a tractor.

The frame 13 of the trailer 11 includes a base member 23 connecting the two axles 15 and 17 together. A forward vertical support post 25 extends upward from just above the center of the forward axle 15. Likewise, a rear vertical support post 27 extends upward from just above the center of the rear axle 17. A horizontal support post 29 extends between the upper ends of the two vertical support posts 25 and 27. The frame 13 may include other structural components as needed for structural strength and stability, depending on the types of structural members used and the ultimate load limit desired. A pair of horizontal bars 30 extend outward left and right from the horizontal support post 29.

A pair of arms 31 extend transversely in both directions from the upper end of the forward vertical support post 25. Likewise, a second pair of arms 31 extend transversely in both directions from the upper end of the rear vertical support post 27. The arms 31 may be horizontal or may be angled upward slightly. A stop 32 extends upward near the outer end of each arm 31.

Figure 4:
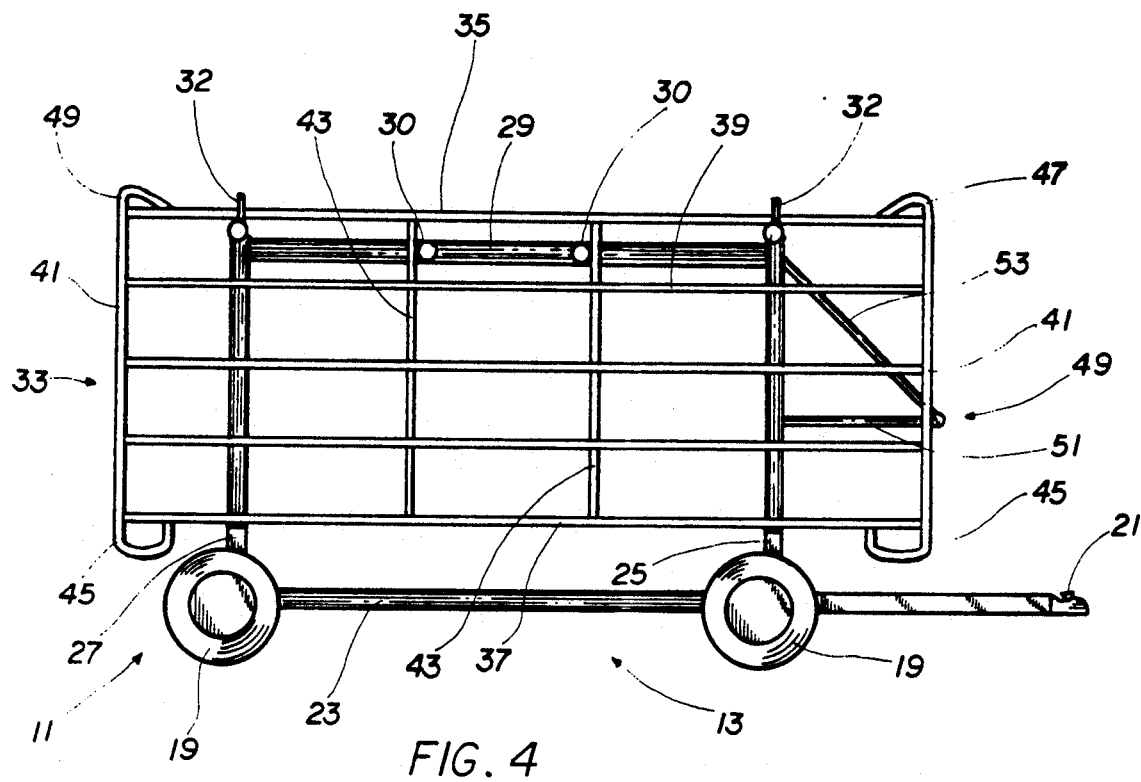
FIG. 4 is a side elevation the carrier of the invention, carrying a load of fence panels.
Figure 5:
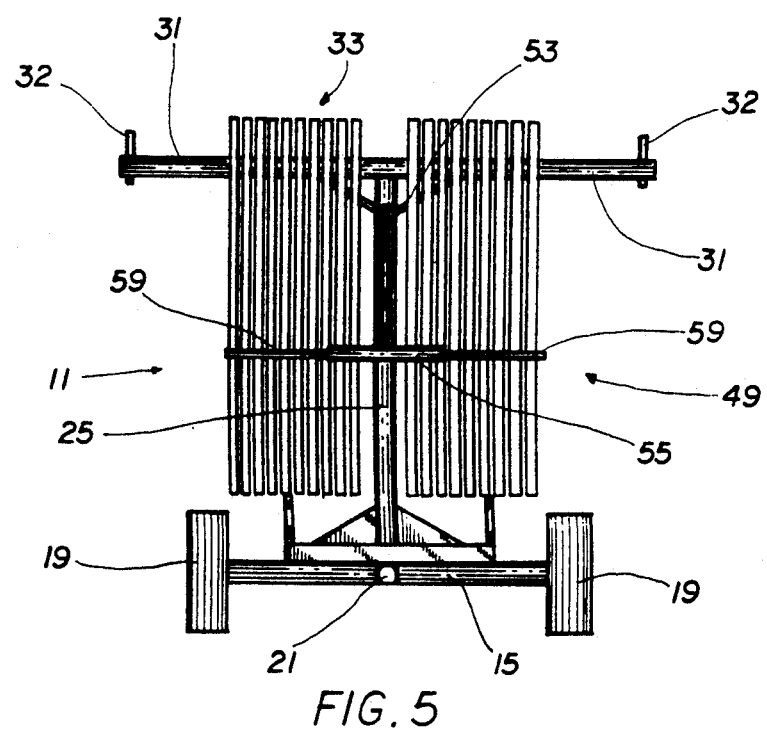
FIG. 5 is a front elevation of the carrier of the invention, carrying a load of fence panels.

The arms 31 support a load of portable fence panels 33, as shown in FIGS. 4 and 5. Portable fence panels 33 come in various sizes, but a typical panel 33 may be about seven feet tall and about fourteen feet long. The panels 33 are usually made of tubular steel, and the carrier 11 can generally carry about forty to fifty panels 33.

A typical panel 33 has a top rail 35, a bottom rail 37, and about four other horizontal rails 39. A typical panel 33 also has two end posts 41 and about two additional vertical posts 43. Each panel 33 may also have a foot 45 at each end of the panel 33. Some fence panels 33 also have loops 47 on the upper corners of the top rail 35.

The fence panels 33 are carried on the carrier 11 as shown in FIGS. 4 and 5. The top rails 35 of the panels 33 rest on the arms 31, and the stops 32 keep the panels 33 from slipping off of the arms 31. The horizontal bars 30 fit between vertical posts 43 on the panels 33 and help to minimize the forward and backward movement of the panels 33.

Figure 3:
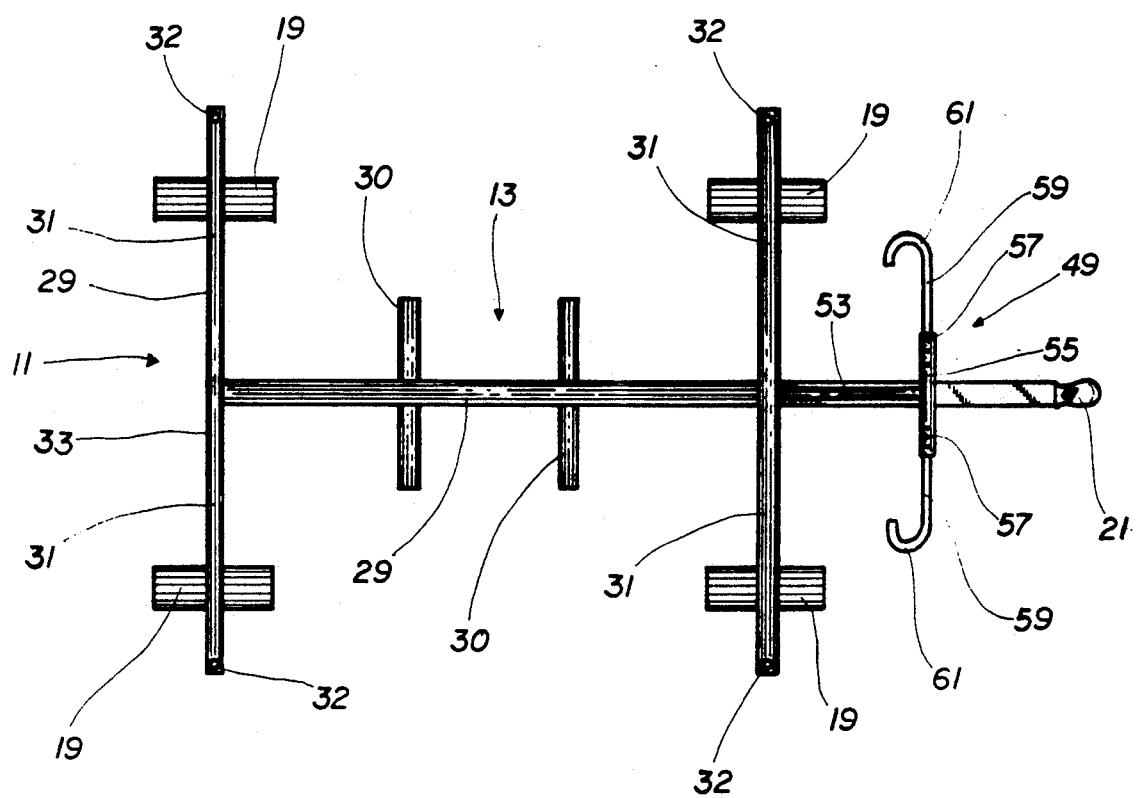
FIG. 3 is a top plan view of the carrier of the invention.

An alignment bar 49 is mounted on the frame 13 by means of a horizontal support member 51 and a diagonal support member 53. The alignment bar 49 includes a primary bar 55, as is best shown in FIG. 3. The primary bar 55 is cylindrical and has a plurality of spaced holes 57. An extension 59 is telescopically received within each end of the primary bar 55. Each extension 59 has a plurality of holes and a pin for securing the extension 59 to the primary bar 55 at a selected position. A hook 61 is located on the end of each extension 59. The hooks 61 wrap around the forward end posts 41 of the fence panels 33 and hold the panels 33 against the alignment bar 49.

In operation, the carrier 11 of the invention carries a plurality of fence panels 33, supported on the arms 31. The forward end posts 41 of the panels 33 are pushed forward against the alignment bar 49. The extensions 59 are then pushed inward until the hooks 61 wrap around the fence panels 33, to hold the panels 33 against the alignment bar 49. The pins are then inserted in to the holes 57 in the primary bar 55 and the extensions 59 to secure the extensions 59.

The carrier of the invention has several advantages over the prior art. The alignment bar 49 secures the fence panels 33 in a position with the forward end posts 41 aligned. Thus the panels 33 cannot slide forward and backward as the carrier 11 is moved. The carrier 11 is easy to operate and to maintain, as well as economical to manufacture.

The invention has been shown and described in only one embodiment. It should be apparent to those skilled in the art that the invention is not so limited, but is susceptible to various changes and modifications without departing from the spirit of the invention.

I claim:

1. A carrier for transporting fence panels, wherein the carrier comprises:
   a frame;
   a pair of arms, extending from the frame to support the panels;
   an alignment bar, attached to the frame and extending across one end of the fence panels to keep the fence panels aligned, wherein the alignment bar further comprises a primary bar, an extension for extending the length of the alignment bar, and a hook on the end of the extension for wrapping around the outermost fence panel to hold the fence panels together.

2. A carrier as recited in claim 3, wherein the alignment bar further comprises a second extension, telescopically connected to the other end of the primary bar.

3. A carrier as recited in claim 2, wherein the alignment bar further comprises a second hook on the second extension.

4. A carrier as recited in claim 3, wherein the alignment bar further comprises a pair of pins for insertion through aligned holes in the primary bar and the extensions in order to lock the alignment bar at a selected length.

5. A carrier as recited in claim 3, wherein the alignment bar is attached to a support bar extending forward from the frame.

6. A carrier as recited in claim 3, further comprising an arm extending transversely from the frame through the interiors of the fence panels to help keep the fence panels aligned.

7. A carrier for transporting fence panels, wherein the carrier comprises:
   a frame, having a vertical support post;
   a pair of arms, extending transversely from the upper end of the vertical support post to support the panels;
   a support member, attached to the vertical support post and extending forward from the vertical support post;
   an alignment bar, attached to the support member and extending transversely to the vertical support post and across one end of the fence panels to keep the fence panels aligned;
   wherein the alignment bar further comprises:
   a primary bar;
   an extension, telescopically connected to one end of the primary bar, for extending the length of the alignment bar; and
   a hook on the end of the extension for wrapping around the outermost fence panel to hold the fence panels together.

8. A carrier as recited in claim 7, wherein the alignment bar further comprises a second extension, telescopically connected to the other end of the primary bar.

9. A carrier as recited in claim 8, wherein the alignment bar further comprises a second hook on the second extension.

10. A carrier as recited in claim 9, wherein the alignment bar further comprises a pair of pins for insertion through aligned holes in the primary bar and the extensions in order to lock the alignment bar at a selected length.

11. A carrier as recited in claim 9, wherein the alignment bar is attached to a support bar extending forward from the forward vertical support post.

12. A carrier as recited in claim 9, further comprising an arm extending transversely from the horizontal support post through the interiors of the fence panels to help keep the fence panels aligned.

13. A carrier for transporting fence panels, wherein the carrier comprises:
   a forward axle;
   a rear axle;
   two sets of wheels, one set attached to each axle;
   a base member connecting the two axles together;
   a forward vertical support post, extending upward from the center of the forward axle;
   a rear vertical support post, extending upward from the center of the rear axle;
   a horizontal support post, extending between the upper ends of the two vertical support posts;
   a trailer hitch attached to the base member;
   a pair of arms, extending transversely in both directions from the upper ends of the vertical support posts to support the panels;
   an alignment bar, attached to the forward support post and extending across one end of the fence panels to keep the fence panels aligned.

14. A carrier as recited in claim 13, wherein the alignment bar further comprises:
   a primary bar; and
   an extension, telescopically connected to one end of the primary bar, for extending the length of the alignment bar.

15. A carrier as recited in claim 14, wherein the alignment bar further comprises a hook on the end of the extension for wrapping around the outermost fence panel to hold the fence panels together.

16. A carrier as recited in claim 15, wherein the alignment bar further comprises:
   a second extension, telescopically connected to the other end of the primary bar; and
   a hook on the end of the second extension.

* * * * *